United States Patent [19]

Venkat et al.

[11] Patent Number: 4,850,117
[45] Date of Patent: Jul. 25, 1989

[54] CONDENSATION AND RECOVERY OF SOLVENT AND OTHER VAPORS

[75] Inventors: Rajoo Venkat, 11937 Butternut St., Palm Beach Gardens, Fla. 33410; Melvyn H. Boyes, West Palm Beach; Howard S. Estes, Delray Beach, both of Fla.

[73] Assignees: Northern Telecom Limited, Montreal, Canada; Rajoo Venkat, Palm Beach Gardens, Fla.

[21] Appl. No.: 82,271

[22] Filed: Aug. 6, 1987

[51] Int. Cl.⁴ ............................................. F26B 21/06
[52] U.S. Cl. ........................................... 34/32; 34/75; 55/256
[58] Field of Search .......................... 34/76, 78, 75, 32; 55/233, 257 HE, 259, 256, 257 R, 80; 261/98, 152; 110/215, 216, 217

[56] References Cited

U.S. PATENT DOCUMENTS

| | | | |
|---|---|---|---|
| 3,364,656 | 1/1968 | Whiton et al. | 55/233 X |
| 3,409,409 | 11/1968 | Sackett, Sr. | 55/259 X |
| 3,486,307 | 12/1969 | McDermott | 55/256 X |
| 3,622,466 | 11/1971 | West | 55/259 X |
| 3,768,234 | 10/1973 | Hardison | 55/233 X |
| 3,854,909 | 12/1974 | Hoisington et al. | 55/257 HE X |
| 3,885,929 | 5/1975 | Lyon et al. | 55/259 X |
| 3,967,940 | 7/1976 | Hirano et al. | 55/257 R X |
| 4,533,367 | 8/1985 | Hadzismajlovic | 55/233 X |
| 4,539,184 | 9/1985 | Stehning | 55/256 X |

Primary Examiner—Henry A. Bennet
Attorney, Agent, or Firm—Foley & Lardner, Schwartz, Jeffery, Schwaab, Mack, Blumenthal & Evans

[57] ABSTRACT

Process vapors are condensed and recovered by bubbling a vapor up through a bed of inert particulate material, immersed in a liquid. The particulate material is supported on a perforated member in a container, with a condensate collecting chamber at the bottom. The condensate collects below the liquid. The vapor is fed through a diffuser positioned below the bed and condensate can be recycled to backwash the bed. The liquid temperature is controlled, together with the liquid level, liquid pH and also vapor flow rate.

25 Claims, 3 Drawing Sheets

CONDENSATION AND RECOVERY OF SOLVENT AND OTHER VAPORS

BACKGROUND OF THE INVENTION

1. Field of the Invention

This invention relates to the condensation and recovery of solvent and other vapours. Particularly, the invention is concerned with the recovery of vaporizing solvents and other materials such as are used in the soldering and cleaning of circuit boards.

After use, the vapours are preferably recovered. Various reasons make this advisable, such as the cost of the original fluid, and the fact that the vapours are often toxic and therefore cannot be discharged into the atmosphere.

2. Related Art

Present techniques vary, but are generally complex and expensive. For example, the vapour is passed through a column of activated charcoal, where the solvent or other material is adsorbed. Once saturated, the charcoal is purged with steam, the steam condensed and the solvent separated. The charcoal bed is dried by heating, for example by hot air, for reuse.

SUMMARY OF THE INVENTION

The present invention provides a simple inexpensive arrangement for recovering solvents and the like, which can be operated on a continual basis.

Broadly, vapours from a process are caused to bubble up through a bed of inert pellets, or similar, immersed in a cooled liquid, for example water. The bed is raised up from the bottom of the chamber to provide a sump or collection space. The liquid level is maintained at a predetermined height and the flow of vapour is controlled to give a predetermined flow rate through the bed. Spray entrainment screens can be positioned above the liquid surface and cooling coils can also be provided for cooling the liquid. Collected liquid in the sump can be pumped up to backwash the bed at intervals. Various monitors and controls can be provided for monitoring, and controlling, pH value of the liquid, the height of the liquid, temperature of the liquid, and other parameters.

BRIEF DESCRIPTION OF THE DRAWINGS

The invention will be readily understood by the following description of certain embodiments, by way of example, in conjunction with the accompanying drawings, in which.

DETAILED DESCRIPTION OF THE EMBODIMENTS

Figure 1:
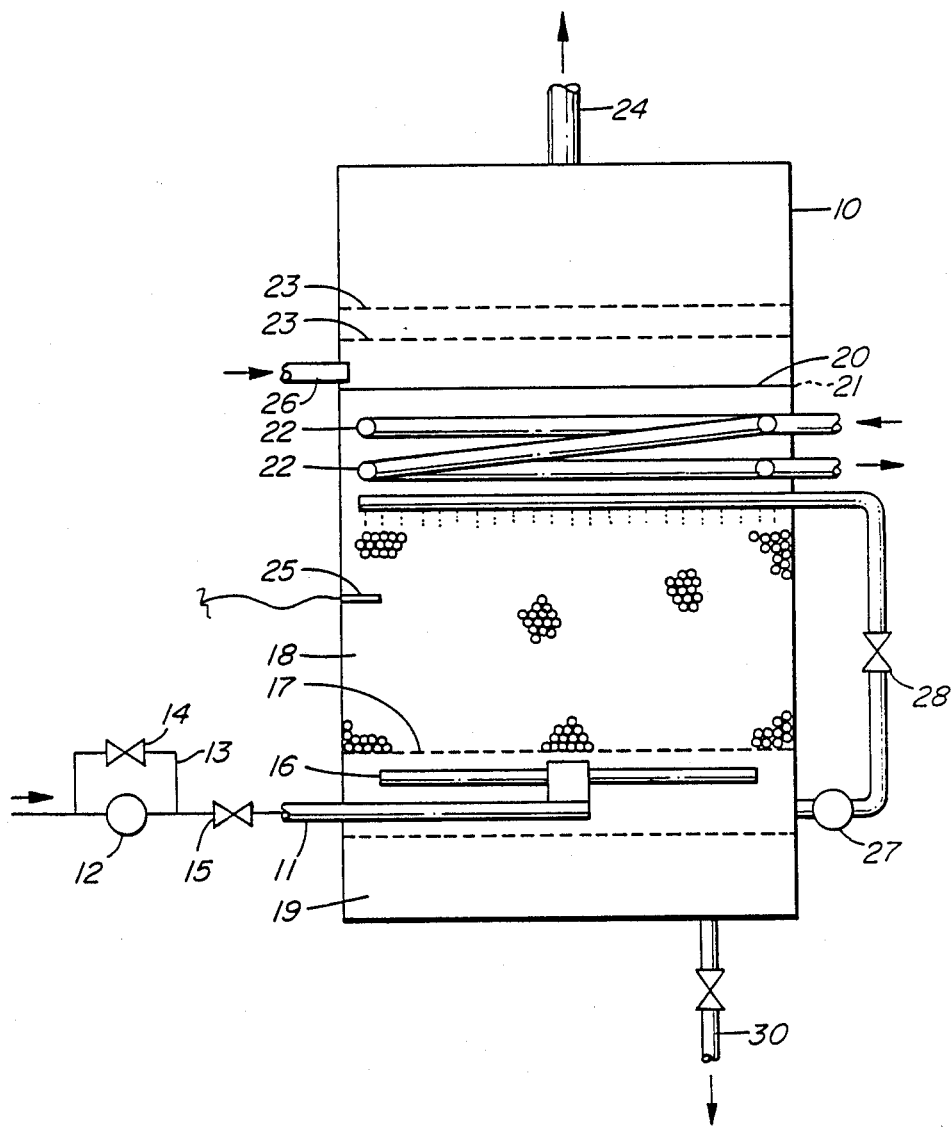
FIG. 1 is a vertical cross-section through a diagrammatic illustration of one form of apparatus.

FIG. 1 illustrates very diagrammatically one form of recovery apparatus. Basically, the apparatus comprises a tank 10 having an inlet 11 for the vapour to be treated. The vapour is fed from the source to the tank by a pump 12 with a bypass loop 13 having a control valve 14. A further valve 15 controls the flow into the tank. The vapour is fed to a diffuser 16. Above the diffuser is a perforated support plate 17 on which rests a bed of inert pellets or similar particulate material, indicated at 18. The pellets can be of quartz, plastic or other suitable material. Chamber 19 is formed below the support plate 17.

The tank is filled with water, or other suitable fluid, up to a level at 20. The surface level 20 is maintained at a predetermined position 21 to provide a predetermined head, which relates to the head supplied by the pump 12. The water is cooled by a cooling coil 22. Above the water, there are positioned entrainment screens 23 to break down any spray arising from the water. Vapour issuing from the water collects at the top of the tank and is vented through outlet 24.

The pH of the water is monitored and maintained at a desired value, a monitor indicated at 25. A water inlet is shown at 26.

A pump 27 and valve 28 provide for reflux or backwashing treatment of the pellets. This assists in maintaining a high level of condensation. Collected condensate can be removed from the bottom of the tank through outlet 30.

To appreciate the invention, the problems of condensing a vapour need to be discussed. In some forms of vapour cleaning apparatus, an attempt is made to reduce vapour escape by providing cooling coils around the periphery of the tank. Very little of the vapour actually contacts the coils and thus very little is condensed. Bubbling a vapour through a liquid is also not very efficient as only the walls of the bubbles are in contact with the liquid and much vapour passes right up through the liquid and escapes. Adsorption processes are more complex and expensive.

In the present invention, the vapour is dispersed in a finely divided form, of small bubbles, via the diffuser 16. To prevent the bubbles passing straight up through the liquid, the pellets are provided. These break up the bubbles, causing the vapour to flow around and over the pellets, at the same time moving in intricate contact with the liquid. A very high condensation level is obtained. This is further enhanced by cooling the liquid.

As the vapour condenses, it moves down and collects in liquid form at the bottom of the tank. For efficient operation, it is desirable that the condensate at all times be below the level of the diffuser.

A typical value for the liquid temperature is 40° F. The condensation is related to the temperature of the liquid, the residence time of the vapour in the liquid and the surface area for heat transfer. The cooled liquid is the first part of this relationship, the flow rate of the vapour and the depth of the liquid is the second part and the pellets provide for an increase surface area.

The liquid used is one in which the vapour will condense and in which it is not soluble. Other contaminants and pollutants that are soluble are removed, as are also contaminants and pollutants that are not soluble. Water is a satisfactory liquid for waste solvent and other vapours as used in various processes in the manufacture of circuit boards, for example. Degreasing and other vapours as used in industry can also be removed. It is not only the financial gain in reclaiming the vapours of expensive materials which is an advantage of the invention. The removal of vapours from processes, cheaply and efficiently, is also a big environmental advantage, as the remaining vapour is often clean enough to permit direct venting to atmosphere.

In addition to additives for pH control, dewetting agents can also be added to reduce surface wetting of the pellets. However, eventually the pellets become completely covered with condensate. It is possible to reduce this effect by backwashing the pellets by condensed vapour, as described above.

Figure 2:
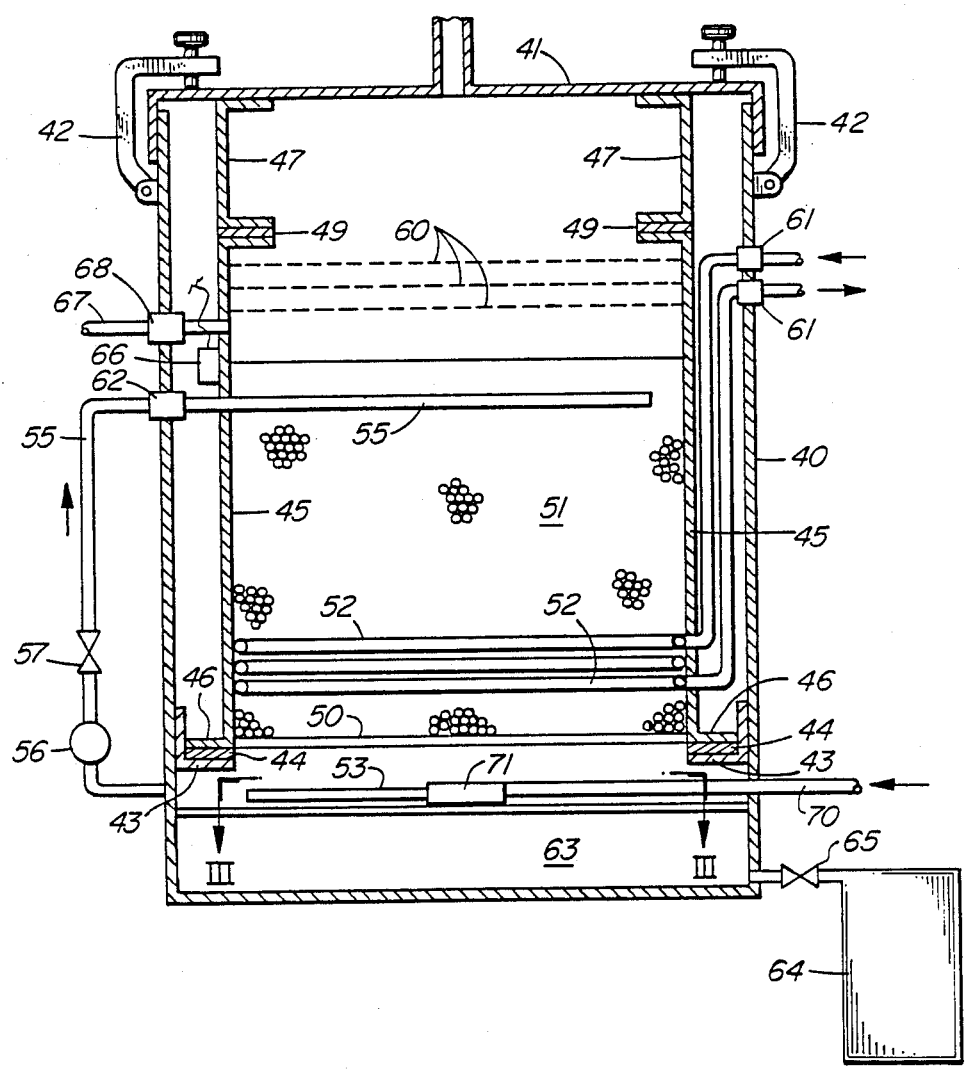
FIG. 2 is a similar diagrammatic vertical crosssection of an alternative form.

FIG. 2 illustrates an apparatus which is a form of a cartridge or removable and replaceable unit. An outer tank 40 has a removable lid 41, held in position by clamps 42, which conveniently can be screw clamps, as shown, or of over-center form for example. A ledge 43 is positioned around the inner peripheral surface of the tank, a short distance above the bottom of the tank. A ring of resilient material 44 is positioned on the ledge. An inner cylindrical member 45 rests at its bottom edge 46 on the resilient material 44. In the example, the member 45 extends up towards the lid 41 with a short cylindrical spacer 47 extending between the top end 48 of member 45 and the lid. A further ring of resilient material 49 is positioned between the top end of member 45 and the lower end of spacer 47. The spacer 47 can be permanently attached to the lid.

The cylindrical member 45 has a perforated plate 50 at its lower end, which supports a lid 51 of pellets or other finely divided material. In this example, a cooling coil 52 is positioned at a lower part of the member 45. A diffuser 53 is positioned below plate 50. A reflux or backwash arrangement 55 is provided, with a pump 56 and valve 57. Spray containment screens 60 are also provided.

Quick connect or other suitable connections are provided at 61 for the flow and return of cooling fluid to the cooling coil. A further connection 62 is provided for connecting the condensate feed to the backwash 55. The condensate collects in a bottom chamber 63 in the bottom of the outer tank 40. Flow from the chamber 63 to a separator 64 is controlled by a valve 65. A water level monitor and controller 66 controls the flow of water into the inner member 45, via water supply 67. A connector 68 provides for connection and disconnection for removal of the inner member 45. A pH monitor can also be provided.

Figure 3:
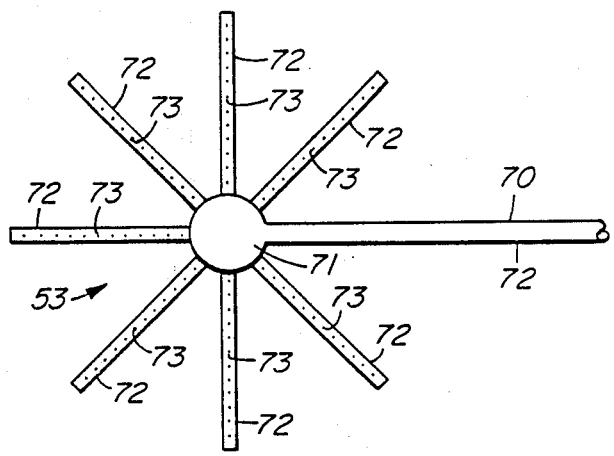
FIG. 3 is a cross-sectional view on the upper surface of a typical diffuser, as on the line III—III of FIG. 2.

FIG. 3 illustrates one form of diffuser, in the particular example as in FIG. 2. The process vapour is fed in via inlet pipe 70 to a central hub 71. Tubes 72 extend radially from the hub, the tubes having holes 73 in the upper parts of their periphery through which flows the vapour.

Figure 4:
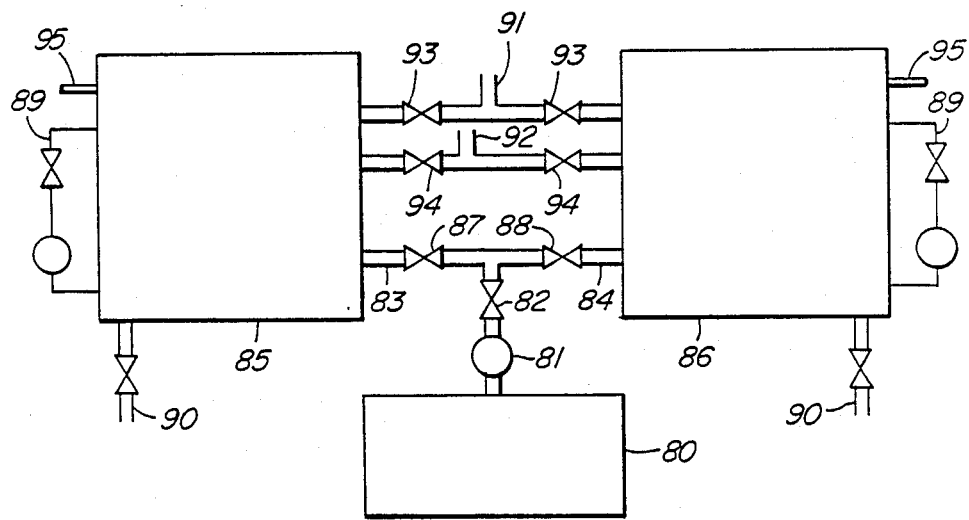
FIG. 4 is an illustration of a duplex installation.

Two sets of condensing apparatus, as illustrated in FIG. 1 or FIG. 2 for example, can be connected in tandem. Such an arrangement is particularly useful with the cartridge or removable chamber form as illustrated in FIG. 2. One set can be operating while the other set is being cleaned or otherwise serviced. Such an arrangement is illustrated very diagrammatically in FIG. 4. A process such as vapour phase soldering, vapour cleaning or the like, are shown at 80. Vapours from the process is fed via pump 81 and valves 82 to alternate feeds 83 and 84 to either of two condensation apparatus 85 and 86. Flow is controlled by valves 87 and 88. The reflex or backwash circuits are indicated at 89 and drains at 90. The cooling fluid inlet and outlet are shown at 91 and 92, respectively, with connections to one or the other of 85 and 86 being controlled by valves 93 and 94. Water supply to the sets are indicated at 95.

It will be appreciated that the apparatus, and the associated process, can be automated with actuation of valves and other items under the control of a central controller. Thus the removal of condensate, feeding of vapour, backflushing and other steps can be automatically controlled, and this control can be applied to the various forms of the apparatus, as in FIG. 1, FIG. 2 and in FIG. 4.

While generally the liquid through which the vapour is bubbled is water, other liquids can be used, depending upon the particular vapour to be condensed. It is desired that the vapour be condensed and collect separately at the bottom of the apparatus. As previously stated, more than one material may be condensed, depending upon the process. Thus, for example, in a soldering process, the vapours from the process may include, in addition to the basic material, a cleaning solvent such as fluorinated hydrocarbons and other vapours. These can also be condensed out and then separated from the condensed hydrocarbon.

Once removed, the condensates can be re-used. There is thus a reduction in material to be disposed of and also a considerable financial saving where the condensates are expensive. The process is carried out at below room temperature and conveniently enclosing the condensing chamber in an outer chamber, as in FIG. 2 for example, assists in maintaining the apparatus at a required temperature. The system is very energy efficient.

Depending upon the vapours being treated, and the resultant condensate, the material forming the parts of an apparatus can vary. They must be capable of withstanding any corrosive or other effects of the vapours and/or condensate.

What is claimed is:

1. Apparatus for the condensation and recovery of process vapours, comprising:
   a container having a base and an upwardly extending peripheral wall;
   a perforated support member extending over and spaced up from said base to define a bottom chamber for collecting condensed vapour;
   a bed of inert particulate material supported on said perforated support member;
   said container filled with a condensing liquid to a level above said bed of inert material and including a cooling coil in said container for cooling said liquid;
   a diffuser extending below said perforated support member; and
   means for feeding a process vapour to said diffuser.

2. Apparatus as claimed in claim 1 including liquid spray means positioned above said bed of inert material, and means for feeding liquid to said spray means to backwash the inert material.

3. Apparatus as claimed in claim 2, said means for feeding liquid to said spray means including means for feeding said condensing liquid and condensed vapour.

4. Apparatus as claimed in claim 1, including means for maintaining the level of said liquid at a predetermined position.

5. Apparatus as claimed in claim 1, including control means for controlling the flow of process vapour to said diffuser.

6. Apparatus as claimed in claim 1, including a spray entrainment screen above said liquid.

7. Apparatus as claimed in claim 1, including a support ledge extending around on the inside of said peripheral wall, an inner container member having a lower edge on said support ledge, said perforated support member extending across and forming a bottom wall of said inner container member, said cooling coil being positioned in said inner container member.

8. Apparatus as claimed in claim 7, including liquid spray means positioned above said bed of inert material and means for feeding liquid to said spray means to backwash said bed of inert material.

9. Apparatus as claimed in claim 8, said liquid spray means being positioned in said inner container member, said means for feeding liquid to said spray means extending through said peripheral wall of said container and including connection means for releasable connection to said liquid spray means.

10. Apparatus as claimed in claim 9, said means for feeding liquid to said spray means including means for feeding said condensing liquid and condensed vapour.

11. Apparatus as claimed in claim 7, including releasable connection means for said cooling coil.

12. Apparatus as claimed in claim 7, including a removable lid extending over said container and an outlet for residual vapours in said lid.

13. Apparatus as claimed in claim 12, including clamping means for holding said lid on said container.

14. Apparatus as claimed in claim 7, including a resilient member extending between said lower edge of said inner container member and said support ledge.

15. Apparatus as claimed in claim 14, including a further resilient member extending between a top edge of said inner container member and said lid.

16. Apparatus as claimed in claim 15, including a spacer member on an inner surface of said lid, said further resilient member extending between said spacer member and said top edge of said inner container member.

17. Apparatus as claimed in claim 1, including means for draining condensed vapour from said bottom chamber.

18. Apparatus as claimed in claim 1, comprising two containers in tandem, each container having a base and an upwardly extending peripheral wall; a perforated support member in each container; a bed of inert material in each container; each container being filled with a condensing liquid to a level above the bed of inert material; a diffuser extending below each perforated support member; and means for feeding a process vapour alternately to said diffusers.

19. A method of condensing and recovering process vapours, comprising:
bubbling a process vapour up through a bed of inert particulate material immersed in a condensing liquid; and
collecting condensed vapour in a chamber below said bed.

20. The method of claim 19, including feeding said process vapour through a diffuser below said bed.

21. The method of claim 19, including periodically feeding condensing liquid and condensed vapour from said chamber to spray means above said bed, to backwash said bed.

22. The method of claim 19, including maintaining the temperature of said liquid at a predetermined value.

23. The method of claim 19, including maintaining the surface of said liquid at a predetermined level.

24. The method of claim 19, including monitoring the pH value of the liquid.

25. The method of claim 19, including the removal of condensate from said chamber and passing the condensate through a separator.

* * * * *